United States Patent [19]

Schollenberger

[11] Patent Number: 4,552,932
[45] Date of Patent: Nov. 12, 1985

[54] RADIATION CURABLE POLYURETHANES

[75] Inventor: Charles S. Schollenberger, Hudson, Ohio

[73] Assignee: The B. F. Goodrich Company, Akron, Ohio

[21] Appl. No.: 605,514

[22] Filed: Apr. 30, 1984

[51] Int. Cl.[4] ..................... C08F 283/04; C08G 18/38
[52] U.S. Cl. .................................... 525/440; 525/445; 525/920; 204/159.15
[58] Field of Search ....................... 525/440, 920, 445; 204/159.15

[56] References Cited

U.S. PATENT DOCUMENTS

| 4,112,017 | 9/1978 | Howard | 525/920 |
| 4,246,379 | 1/1981 | Howard | 525/440 |
| 4,254,230 | 3/1981 | Howard | 525/440 |
| 4,390,662 | 6/1983 | Ando et al. | 525/440 |
| 4,439,600 | 3/1984 | Moran | 525/440 |
| 4,451,636 | 5/1984 | Tsao | 525/440 |

Primary Examiner—Melvyn I. Marquis
Assistant Examiner—A. L. Carrillo
Attorney, Agent, or Firm—J. Hughes Powell, Jr.; Alan A. Csontos

[57] ABSTRACT

Improved radiation curable polyurethanes are provided that are polymerizable crystalline polymers having terminal ethylenic unsaturation, relatively low molecular weights and that rapidly crystallize, are prepared from the reaction product of (1) certain polyester glycols and diisocyanates to form an isocyanate-terminated prepolymer that is then reacted with an ethylenic unsaturated alcohol to form the ethylenic unsaturated crystallizable polymer, or in the alternative, (2) the polyester glycol is reacted with an ethylenic unsaturated monoisocyanate to form the polymerizable crystallizable polymer, that can be used as such for example in preparing magnetic tape, as such, or in admixture with other materials, and which can be applied to a substrate from a melt, or formed by molding, extrusion, and then cured with appropriate energy as an electron beam.

11 Claims, No Drawings

RADIATION CURABLE POLYURETHANES

BACKGROUND OF THE INVENTION

Polyurethanes that may be crosslinked or cured by radiation to provide a crosslinked polymer are useful, for example, in magnetic recording media wherein the magnetic coating contains a magnetic material, usually a ferri-magnetic material, embedded in a binder matrix of such polyurethanes and small amounts of other additives such as lubricants, dispersants, conductive agents and the like. However, use of many polyurethanes is limited because of processing problems, particularly dimensional stability during processing. Radiation curable polyurethanes having improved and more flexible processability are desired.

U.S. Pat. No. 4,255,243 discloses photo-crosslinkable unsaturated poly-(carbonate-urethanes) obtained by condensing a diisocyanate with a polycarbonatediol and a lower hydroxyalkyl acrylate. U.S. Pat. No. 4,260,703 discloses radiation curable urethane-acrylates prepared by reacting an alkoxylate of an ester diol such as 2,2-dimethyl-3-hydroxypropyl-2,2-dimethyl-3-hydroxypropionate with a diisocyanate, capped with a hydroxyalkyl acrylate such as hydroxyethyl acrylate. U.S. Pat. No. 4,264,752 discloses compositions formed by the reaction of a polycarbonate polyol, a polyisocyanate and a hydroxy acrylate monomer as hydroxyethyl acrylate that can be used as radiation curable coatings. Also U.S. Pat. No. 4,254,230 discloses unsaturated polyether-ester urethanes which are actinic radiation-curable in the presence of air. These are complex polymers containing at least one unsaturated urethane oligomer, said oligomer comprising the reaction product of at least one unsaturated active hydrogen-containing compound, at least one polyisocyanate, and at least one polyether-ester. The amount of said unsaturated compound being present in molar amount equivalent to the isocyanate compound. None of these compounds is completely satisfactory as to processability for use in radiation curable magnetic tape applications.

SUMMARY OF THE INVENTION

Improved radiation curable polyurethanes are provided that are polymerizable crystalline polymers having terminal ethylenic unsaturation, relatively low molecular weights and that rapidly crystallize, are prepared from the reaction product of (1) certain polyester glycols and diisocyanates to form an isocyanate-terminated prepolymer that is then reacted with an ethylenic unsaturated alcohol to form the ethylenic unsaturated crystallizable polymer, or in the alternative, (2) the polyester glycol is reacted with an ethylenic unsaturated monoisocyanate to form the polymerizable crystallizable polymer, that can be used as such for example in preparing magnetic tape, as such, or in admixture with other materials, and which can be applied to a substrate from solution or from a melt, or formed by molding, extrusion, and then cured with appropriate energy such as an electron beam.

DETAILED DESCRIPTION

The novel polymerizable crystalline polymers of this invention have a number of useful advantages. They are crystalline solids at room temperature. They are readily soluble in many simple solvents such as methyl ethyl ketone and cyclohexanone, as compared to the powerful and strongly polar solvents normally required to dissolve polyurethanes, of which dimethyl formamide is typical. These polymers, when melted, or upon solvent removal and/or cooling, quickly crystallize and present a dry surface to allow prompt handling or mechanical processing such as calendering, and have strong thermoplastic bonds even before cure.

Because these novel polymers can be cured in the crystalline state, they can thus be utilized to fix and maintain the alignment of the contained particulate material, especially the magnetic oxide, thus increasing the packing density and signal response in applications such as magnetic tape. Further, the densifying action of crystallization in the defined polymers prior to cure should reduce excessive shrinkage often encountered in the radiation cure of liquid polymerizable polymers. Since the radiation cure of these polymers in the crystalline state is possible, enhanced vulcanizate properties should be realized as compared to use of the liquid, non-crystallizable polymers used heretofore.

The polyester glycols are essentially linear hydroxyl-terminated macroglycols having number average molecular weights between about 1000 and 10000, usually about 1500 to 6000. The polyesters utilized include those prepared, for example, by the polyesterification of hereinafter defined aliphatic dicarboxylic acids with aliphatic glycols. The dicarboxylic acids include for example, succinic, adipic, suberic, sebacic, dodecanoic and like acids or their anhydrides. Aromatic dicarboxylic acids may also be used, or mixtures of aliphatic and aromatic dicarboxylic acids. Useful acids include aliphatic dicarboxylic acids having an even number of carbon atoms of the formula HOOC—R—COOH wherein R is an alkylene radical containing 2, 4, 6, 8, 10 and 12 carbon atoms, preferably 4 to 6 carbon atoms. The The phthalic acids are also useful.

The glycols used in the preparation of the polyesters by reaction with the dicarboxylic acids are normally aliphatic glycols containing between 2 and 10, even number, carbon atoms, usually 2, 4, and 6 carbon atoms such as ethylene glycol, 1,4-butanediol, 1,6-hexamethylene glycol, 1,8-octamethylene glycol, 1,10-decamethylene glycol and the like; cyclic diols including 1,4-cyclohexanedimethanol; and aromatic polyols as bis-1,4-(2-hydroxyethoxy)benzene, xylylene glycols and the like.

Partial polyesteramides are also contemplated, usually by substitution of a diamine or amino alcohol for part of the glycol, in amounts inadequate to prevent polyesteramine crystallization. Typical amines and amino alcohols include: ethylene diamine, tetramethylene diamine, hexamethylene diamine, 1,4-cyclohexane diamine, monoethanolamine, diethanolamine, paraphenylenediamine, and the like.

The organic polyisocyanates which may be reacted with the defined macroglyols include, for example, aliphatic, alicyclic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4-diisocyanate, the tolylene diisocyanates, p-phenylene diisocyanate, diphenyl methane diisocyanate, dibenzyl diisocyanate, diphenyl ether diisocyanates, bitolylene diisocyanates, m- and p-tetramethylxylene diisocyanate, and the like.

Preferably the diisocyanates are aromatic, aliphatic, or alycyclic with symmetrical structure such as those of the formulas

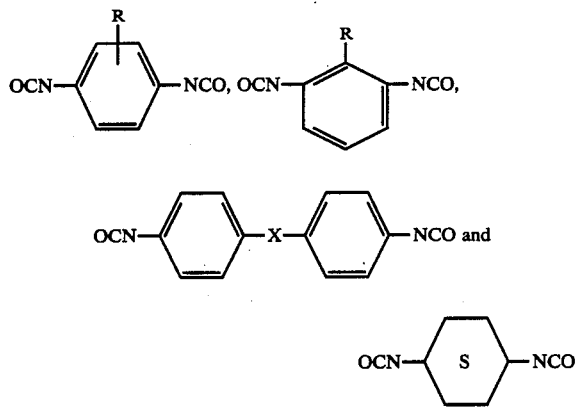

wherein R is hydrogen or alkyl and X is a valence bond, an alkylene radical of 1 to 5 carbon atoms, oxygen, sulfur, sulfoxide, sulfur and the like, and S denotes saturation.

A molar excess of diisocyanate relative to the macroglycol, i.e., —NCO to —OH groups, is used to insure an isocyanate terminated prepolymer. About 1.3 to 3 mols of organic diisocyanate per mol of macroglycol is used when the diisocyanate is reacted directly with the polyester glycol. While a higher ratio may be used, it is not normally necessary.

Catalysts may be used to speed up the polyurethane formulation and any of those catalysts normally used by those skilled in the art may be employed. Typical catalysts include dibutyltin dilaurate, stannous octoate, phenyl mercuric propionate, lead octoate, iron acetylacetonate, magnesium acetylacetonate, triethylene diamine, and the like. These may be used, normally in amounts from about greater than 0.01 up to 10 parts per 100 parts of polyurethane being formed, and more normally greater than 0.03 to 5 phr.

The ethylenic unsaturated alcohol reacted with the isocyanate terminated prepolymers include hydroxyacrylate or -alkacrylate, acrylic acid and alkacrylic acid derivatives, including methacrylic acid and ethacrylic acid. Typical compounds include 2-hydroxyethyl acrylate, 2-hydroxybutyl acrylate, 2-hydroxyethyl methacrylate, 2-hydroxypropyl acrylate, 2-hydroxypropyl methacrylate, 2-hydroxyethyl ethacrylate, diethylene glycol monoacrylate, diethylene glycol monomethacrylate and the like. Useful hydroxy alkyl materials may be represented by the formula

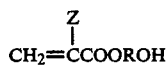

wherein Z is hydrogen, methyl, ethyl or propyl, and R is a divalent alkylene radical containing 2 to 8 carbon atoms, preferably 2 to 3 carbon atoms. An essentially equivalent amount or slight excess of these hydroxyalkyl acrylate compounds is reacted with the isocyanate terminated polyester prepolymer to insure that essentially all of the polyurethane molecules are acrylate terminated.

The terminal ethylenic unsaturated polyester is prepared by reacting 1 mole of the isocyanate terminated polyester with about 2 to 2.2 moles of the hydroxyacrylate or alkacrylate. Preferably 2.0 to 2.1 moles of hydroxyacrylate or alkacrylate are used. The acrylate terminated molecules have an average of greater than 1.5 terminal acrylate groups per molecule, preferably about 2 terminal groups per molecule. It is understood that the term "acrylate" includes both acrylates and alkacrylates.

An alternative method of preparing the novel electron beam curable polyurethanes of this invention is by the reaction of the defined polyesters with an ethylenic unsaturated monoisocyanate which can be prepared by reacting at least one of the hydroxyacrylate or -alkacrylate listed above with one of the diisocyanates listed above, as in U.S. Pat. No. 2,958,704.

An essentially equivalent amount or slight molar excess of ethylenic unsaturated monoisocyanate is reacted with the polyester glycol to insure ethylenic termination of the crystallization polyurethane. A mol ratio of 2.0 to 2.2 of alkenyl monoisocyanate per mol of polyester glycol is used, preferably 2.0 to 2.1 mols.

Typical ethylenic unsaturated monoisocyanates such as described in U.S. Pat. No. 2,958,704 are those having the general formula

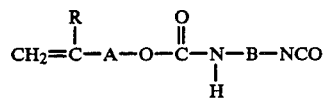

wherein R represents hydrogen or an alkyl group having from 1 to 6 carbon atoms; A represents an alkylene group having from 1 to 6 carbon atoms, a carbonyloxyalkylene group having from 2 to 7 carbon atoms; and B represents an arylene group having from 6 to 18 carbon atoms, an alkylene group having from 4 to 18 carbon atoms or a cycloalkylene group having from 4 to 18 carbon atoms.

The alkenyl isocyanates include but are not limited to such materials as the monoallylurethane of 2,4-tolylene diisocyanate, the monomethallylurethane of 2,4-tolylene diisocyanate, the mono(tetramethylene glycol monovinyl ether)urethane of 2,4-tolylene diisocyanate, the mono(heptamethylene glycol monovinyl ether)urethane of 2,4-tolylene diisocyanate, the mono(hexamethylene glycol monoallyl ether)urethane of 2,4-tolylene diisocyanate, the mono(cyclohexylene glycol monomethallyl ether)urethane of 2,4-tolylene diisocyanate, the mono(ethylene glycol monoallyl ether)urethane of 2,4-tolylene diisocyanate, the mono(2-hydroxyethyl methacrylate)urethane of 2,4-tolylene diisocyanate, the mono(2-hydroxyethyl acrylate)urethane of 2,4-tolylene diisocyanate, the mono(tetramethylene glycol monoacrylate)urethanes of 2,4-tolylene diisocyanate, 1,8-diisocyanate-p-methane, 1-methyl-1,4-diisocyanato cyclohexane, 1-methyl-1,3-diisocyanato cyclopentane, 2,2-dimethyl-1,2-diisocyanato ethane, 8,8-dibutyl-1,8-diisocyanato octane and the like and others. A preferred group of ethylenic unsaturated monoisocyanates includes 2-isocyanato ethyl methacrylate, monoallylurethane of 2,4-tolylenediisocyanate, monoallyl of 2,6-tolylene diisocyanate, mono(2-hydroxyethylacrylate)urethane of 2,4-tolylenediisocyanate, mono(2-hydroxypropylacrylate)urethane of 2,4-tolylenediisocyanate, mono(2-hydroxyethyl methacrylate)urethane of isophoronediisocyanate or of 2,4-tolylenediisocyanate.

The ethylenic-terminated polymers of this invention have a melting point range of about 30° C. to about 80° C., preferably about 45° C. to about 65° C. While they may be used as such, these polymers are soluble in simple organic solvents such as methyl ethyl ketone and cyclohexanone, as well as the more powerful dimethyl formamide and tetrahydrofuran, and so can be applied from solution.

The terminal ethylenic unsaturated polyesterurethanes of this invention may be prepared, for example, by charging to a reaction vessel, under dry nitrogen, an excess amount of diisocyanate heated to about 60° C., and adding the polyester glycol in increments with stirring in amounts to maintain the reaction temperature at about 80° C. to 90° C., normally over a period of about 1 to 2 hours. (0.04% phenyl mercuric propionate or 0.04% stannous octoate catalysts may be added to the reactor if desired.) When the reaction is completed, 0.02% phenothiazine stabilizer is added to the isocyanate-terminated prepolymer. A molar excess of the hydroxy alkyl-acrylate or -alkacrylate is then added to the polyester prepolymer at a rate to maintain a reaction temperature of about 80° C. to 90° C. until there is less than 0.03% and preferably no detectable free isocyanate groups left in the reaction mixture. This normally requires about 3 to 3.5 hours.

To demonstrate electron beam cures, the unsaturated polyurethanes were dissolved in tetrahydrofuran (THF) to form solutions, and the solution cast on release paper, and dried at 110° C. The samples were then cured with electron beam radiation. For 4, 6, or 8 megarad dosages the films were exposed to a 4, 6, 8 milliamp, 200 terminal voltage beam at a rate of 22 feet per second linear speed of the film.

For ultra-violet cures, a 75% solution in tetrahydrofuran was prepared, 1 part of an ultra violet sensitizer, methyl benzoyl formate or 2,2-dimethoxy-2-phenylacetophenone per 100 parts of polyurethane, was stirred in. The cement was spread on release paper, dried and cured under nitrogen sweep by brief exposure to ultra violet light in an exposure chamber.

Cure is evidenced by decrease in elongation and increased modulus of the polyurethanes, as well as insolubility and a low swell in tetrahydrofuran. Samples that have not cross-linked or cured well will dissolve, become glutinous, or break up in tetrahydrofuran, while cured samples will only swell, and the less the swell the tighter the cure.

EXAMPLE I

Following the general procedure set forth above, a terminal ethylenic unsaturated polyesterurethane was prepared. First, 261.3 weight parts of 2,4-tolylene diisocyanate and 1588 weight parts of poly(tetramethylene adipate)glycol having a molecular weight of 2080 were reacted together to form the isocyanate terminated polyester prepolymer. 0.364 weight parts of phenothiazine stabilizer and 0.683 weight parts of phenyl mercuric propionate catalyst were added at the end of the reaction to the mixture. 183.3 weight parts of 2-hydroxyethyl acrylate was then added to the prepolymer to form the desired ethylenic unsaturated polyesterurethane. The mol ratio of reactants was 2.0 diisocyanate:1.0 polyester glycol:2.1 hydroxyethyl acrylate. On cooling, the polyurethane readily crystallized. When heated to about 60° C., the solid polyurethane became a viscous liquid, but on cooling at room temperature, within about 10 minutes, the polyurethane recrystallized again. The polyurethane was soluble in methyl ethyl ketone. A solution was prepared from 20 grams of polyurethane, 10 grams of tetrahydrofuran and 0.2 grams of methylbenzoyl formate UV sensitizer. Films were drawn down and 1 to 4 mil thickness film was exposed to ultraviolet radiation under nitrogen sweep in an exposure chamber at 20, 30 and 60 seconds. After exposure the resulting elastomeric films were tested for cure by immersing in tetrahydrofuran. None of the samples dissolved or swelled appreciably in the THF, all samples retaining good sharp edges. 5 to 6 mil thick films were similarly prepared without photoinitiator and exposed to an electron beam at 6 and 8 megarad dosages to obtain cured films. In the cured film, at 100% strain, the stress was 1020 psi (7.03 MPa) and the modulus was 455 psi (3.14 MPa) at 50% strain.

EXAMPLE II

A pilot plant charge of the reactants of Example I was made using a mol ratio of reactants of 2.0 mols of 2,4-tolylene diisocyanate to 1 mol of poly(tetramethylene adipate)glycol to 1.78 mols of 2-hydroxyethyl acrylate. The weight average molecular weight was 10,861. Solutions of the polymer in methyl ethyl ketone were readily made at a concentration of 75% polymer.

EXAMPLE III 80 weight parts of diphenyl methane-4,4'-diisocyanate and 588.2 weight parts of poly(tetramethylene adipate)glycol (molecular weight 2936) were reacted together in a mole ratio of 1.6 mol of diisocyanate to 1 mol of polyester glycol to form the isocyanate terminated prepolymer. 0.133 weight part of phenothiazine stabilizer and 0.30 weight parts of stannous octoate catalyst were added to the prepolymer. Then 39.14 weight parts of 2-hydroxyethyl methacrylate was reacted with the prepolymer in a mol ratio of 1.5 mols to 2.6 mols total of diisocyanate and polyol. The resulting ethylenic terminated polyesterurethane was liquid at 80° C., but on cooling, rapidly changed to a crystalline solid. Test films were drawn down from a warm 79% toluene solution to form films. A 2.8 mil film cured at 1 megarad had a stress of 2230 psi (15.38 MPa) at a strain of 10%. A 2.9 film cured at 3 megarads had a 1900 psi (13.10 MPa) stress at a 10% strain, and a stress of 2090 psi (14.41 MPa) at 100% elongation. The weight average molecular weight was 29,433. The polyurethane was readily soluble in methyl ethyl ketone.

EXAMPLE IV 261 weight parts of 2,4-tolylene diisocyanate and 1585.25 weight parts of poly(tetramethylene adipate)glycol, number average molecular weight 2097, were reacted together at about 85° C. to form the isocyanate terminated polyester prepolymer. After addition of 0.37 weight parts of phenothiazine stabilizer and 0.59 weight parts of phenyl mercuric propionate at the end of the reaction, the prepolymer was reacted at about 85° C. with 215.51 weight parts of 2-hydroxyethyl methacrylate to form the ethylenic terminated polyesterurethane. The mol ratio of reactants was 2.0 mol of 2,4-tolylene diisocyanate, 1 mol of poly(tetramethylene adipate)glycol and 2.2 mols of 2-hydroxyethyl methacrylate. A 15% polymer solution in tetrahydrofuran was prepared and films formed therefrom for ultraviolet cures. After the films were formed they were aged in an exhaust hood for 30 minutes to remove the THF solvent. The film samples were cured at 12, 16, 20, 25 and 65 seconds exposure to ultraviolet radiation and tested for cure by placing in tetrahydrofuran. None of the samples dissolved in the THF showing a cure had been obtained.

EXAMPLE V

In making this polyurethane, the mol ratio of reactants used was 1.95 mols of 2,4-tolylene diisocyanate, 1 mol of poly(tetramethylene adipate)glycol, molecular weight 4285, and 1.85 mols of 2-hydroxyethyl methacrylate. 116.6 weight parts of 2,4-tolylene diisocyanate and 1456.9 weight parts of poly(tetramethylene adipate)glycol were reacted together to form the isocyanate terminated prepolymer, which was then reacted with the 2-hydroxyethyl methacrylate to form the ethylenic terminated polyesterurethane. A 75% total solids solution of the polymer in tetrahydrofuran had a viscosity of 11,700 cps. 50% total solids solution of the polyurethane in methyl ethyl ketone was prepared containing 0.5% methyl benzoyl formate and used to form 1 mil test films for ultraviolet exposure to determine curability. The films had no surface tack before cure and could be handled and processed without difficulty. Film samples were exposed to ultraviolet radiation for 10, 15, 30 and 60 seconds and tested for cure by placing the samples in tetrahydrofuran. None of the samples dissolved in the THF, all of them retaining sharp edges with minimum swelling. The uncured polyurethane is soluble in methyl ethyl ketone. The glass transition temperature and melting points of this polymer were determined by means of Differential Scanning Calorimetry. At a temperature change of 10° per minute under nitrogen, the Tg was −48° C., Tcr 18° C. and the Tm was 56° C.

The compositions of this invention may also have incorporated therein small amounts, e.g., from about 0.1 to 20 parts per hundred parts by weight of the polyurethane, of well known elastomer modifiers to serve as mechanical processing aids, for example, inert filler such as silica, and lubricants such as calcium stearate.

An advantage of this polymers of this invention is that they may be processed per se without going through a solution stage. The polymers are melted, pigments and polymers added as desired, formed on a substrate as a tape, and cooled. A further advantage is that calendering may be accomplished without adverse effects to the solidified polymer coatings.

Solutions may be used if desired. Coatings of the polymer blend may be applied from the aforesaid solutions on the surfaces on substrates as metals, polymer tapes and fabrics by the well known operations of spraying, dipping, knife or roller coating. Films can be produced by the usual method of spreading from solution and removing the solvents.

I claim:

1. Radiation curable terminal ethylenic unsaturated polyesterurethanes crystallizable at about 30° C. to about 80° C. comprising the reaction product of polyester glycols having molecular weights from about 2000 to about 6000, consisting of aliphatic glycols containing 2, 4, or 6 carbon atoms and selected from the group consisting of ethylene glycol, 1,4-butanediol, and 1,6-hexamethylene glycol, and aliphatic dicarboxylic acids of the formula HOOC—R—COOH wherein R is a divalent alkylene —R— radical containing 4 or 6 carbon atoms, an organic diisocyanate, and hydroxy acrylates and alkacrylates having the formula

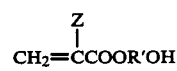

wherein Z is hydrogen, methyl or ethyl and R' is a divalent alkylene —R— radical containing 2 to 6 carbon atoms, in a molar ratio of 1 mol of polyester glycol to about 2 to 3 mols of organic diisocyanate to about 2 to 5 moles of hydroxy acrylate or alkacrylate, the organic diisocyanates have the general formulae

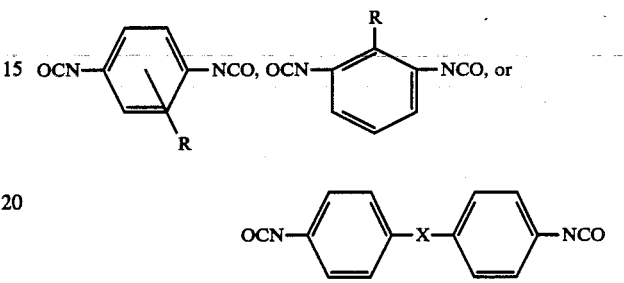

wherein R is hydrogen or methyl and X is a valence bond or a divalent alkylene —R"— radical containing 1 to 3 carbon atoms; and there is used an excess of said hydroxyacrylate or alkacrylate in relation to the free isocyanate group.

2. Ethylenic terminated polyesterurethanes of claim 1 wherein said polyester glycol is poly(tetramethylene adipate)glycol having a molecular weight from about 2000 to about 4500, the organic diisocyanate is selected from the group consisting of 2,4-tolylyne diisocyanate, p-phenylene diisocyanate and diphenylmethane-4,4'-diisocyanate, and the hydroxy acrylate is selected from the group consisting of 2-hydroxyethyl acrylate and 2-hydroxyethyl methacrylate.

3. Ethylenic terminated polyesterurethanes of claim 2 wherein the molar ratio is 1 mol of poly(tetramethylene adipate)glycol, to about 2 mols of said organic diisocyanate and at least 2.01 mols of 2-hydroxyethyl acrylate or 2-hydroxyethyl methacrylate.

4. Ethylenic terminated polyesterurethanes of claim 3 wherein the diisocyanate is 2,4-tolylene diisocyanate, the hydroxy acrylate is 2-hydroxyethyl methacrylate and the molar ratio is about 1:2:2.1.

5. Ethylenic terminated polyesterurethanes of claim 3 wherein the diisocyanate is 2,4-tolylene diisocyanate, the hydroxy acrylate is 2-hydroxyethyl acrylate and the molar ratio is about 1:2:2.1.

6. Ethylenic terminated polyesterurethanes of claim 1 prepared by first reacting said polyester glycol with the organic diisocyanate to form an isocyanate terminated polyesterurethane, and then reacting said isocyanate terminated polyesterurethane with an amount of hydroxy acrylate or alkacrylate to react with at least all of the free isocyanate groups on said isocyanate terminated polyesterurethane.

7. Ethylenic terminated polyesterurethanes of claim 2 prepared by first reacting said poly(tetramethylene adipate)glycol with the organic diisocyanate to form an isocyanate terminated polyesterurethane and then reacting said isocyanate terminated polyesterurethane with an amount of the 2-hydroxyethyl acrylate or 2-hydroxyethyl methacrylate to react with at least all of the free isocyanate groups on said isocyanate terminated polyesterurethane.

8. Ethylenic terminated polyesterurethanes of claim 3 prepared by first reacting said poly(tetramethylene adipate)glycol with the organic diisocyanate to form an isocyanate terminated polyesterurethane and then reacting said isocyanate terminated polyesterurethane with an amount of 2-hydroxyethyl acrylate or 2-hydroxyethyl methacrylate to react with at least all of the free isocyanate groups on said isocyanate terminated polyesterurethane.

9. Ethylenic terminated polyesterurethanes of claim 1 prepared by first reacting the hydroxy acrylate or alkacrylate with the organic diisocyanate to form an ethylenic unsaturated monoisocyanate and thereafter reacting said ethylenic monoisocyanate with the polyester glycol in amounts to provide a terminally unsaturated polyesterurethane.

10. Ethylenic terminated polyesterurethanes of claim 2 prepared by first reacting the 2-hydroxyethyl acrylate or 2-hydroxyethyl methacrylate with the 2,4-tolylene diisocyanate, the p-phenylene diisocyante or the diphenyl methane-4,4'-diisocyanate to form an ethylenic unsaturated monoisocyanate, and thereafter reacting said ethylenic monoisocyanate with the poly(tetramethylene adipate)glycol in amounts to provide a terminally unsaturated polyesterurethane.

11. Ethylenic terminated polyesterurethanes of claim 3 prepared by first reacting a 2-hydroxyethyl acrylate or 2-hydroxyethyl methacrylate with the organic diisocyanate to form an ethylenic unsaturated monoisocyanate and thereafter reacting said ethylenic monoisocyanate with the poly(tetramethylene adipate)glycol in amounts to provide a terminally unsaturated polyesterurethane.

* * * * *